(12) United States Patent
Tanaka et al.

(10) Patent No.: US 7,155,325 B2
(45) Date of Patent: Dec. 26, 2006

(54) PARKING ASSIST APPARATUS

(75) Inventors: Yuu Tanaka, Aichi-gun (JP);
Yoshifumi Iwata, Anjo (JP); Akira Matsui, Toyota (JP); Hisashi Satonaka, Susono (JP); Yuichi Kubota, Okazaki (JP); Tomohiko Endo, Toyota (JP); Hideyuki Iwakiri, Tajimi (JP); Toru Sugiyama, Toyota (JP); Seiji Kawakami, Susono (JP); Katsuhiko Iwazaki, Suntou-gun (JP); Hiroaki Kataoka, Susono (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 92 days.

(21) Appl. No.: 10/809,545

(22) Filed: Mar. 26, 2004

(65) Prior Publication Data

US 2004/0267420 A1   Dec. 30, 2004

(30) Foreign Application Priority Data

Mar. 27, 2003   (JP) ............................. 2003-088649

(51) Int. Cl.
*G06F 7/00* (2006.01)

(52) U.S. Cl. ........................ 701/36; 701/41; 180/199

(58) Field of Classification Search .................. 701/36, 701/41, 42; 180/199, 204, 6.2; 280/762; 307/9.1, 10.1; 340/932.2
See application file for complete search history.

(56) References Cited

U.S. PATENT DOCUMENTS 6,898,527 B1 *   5/2005   Kimura et al. .............. 701/301

FOREIGN PATENT DOCUMENTS

| EP | 1170171 A2 | 1/2002 |
| EP | 1327571 A1 | 7/2003 |
| JP | 10-264839 | 10/1998 |

* cited by examiner

*Primary Examiner*—Yonel Beaulieu
(74) *Attorney, Agent, or Firm*—Buchanan Ingersoll & Rooney PC

(57) ABSTRACT

A method for performing a parking assist control for automatically guiding a vehicle to a target parking position includes the steps of calculating a change of a vehicle direction based on a traveling distance of the vehicle and a steering angle obtained by a steering angle sensor, calculating the change of the vehicle direction based on a yaw rate obtained by a yaw rate sensor, and determining whether or not the parking assist control is required to be stopped based on a result of a comparison between the calculated changes of the vehicle direction.

13 Claims, 2 Drawing Sheets

PARKING ASSIST APPARATUS

This application is based on and claims priority under 35 U.S.C. § 119 with respect to Japanese Application No. 2003-088649 filed on Mar. 27, 2003, the entire contents of which are incorporated herein by reference.

FIELD OF THE INVENTION

This invention generally relates to a parking assist apparatus. More particularly, this invention relates to a parking assist apparatus that performs a parking assist control to thereby guide a vehicle to a target parking position.

BACKGROUND OF THE INVENTION

A known parking assist system for automatically guiding a vehicle to a target parking position estimates a present vehicle position based on each wheel speed detected by a wheel speed sensor, and a yaw rate detected by a yaw rate sensor during the implementation of the parking assist control. In case that the present vehicle position is deviated from a target locus, a wheel steering angle is corrected in response to the deviation amount from the target locus, thereby correcting the deviation from the target locus. Such a parking assist system is disclosed in Japanese Patent Laid-Open Publication No. H10-264839. According to the disclosed parking assist system, when the estimated present vehicle position is deviated from the target locus, the present position being deviated can be corrected without resetting the target locus.

According to the known parking assist system including the above disclosed parking assist system, however, the present vehicle position monitored during the implementation of the parking assist control is an estimated value based on information from the yaw rate sensor, the wheel speed sensor, and the like. Therefore, when a system error such as a malfunction of the yaw rate sensor occurs, the system may wrongly recognize that the present vehicle position is on the target locus despite the fact that the estimated present vehicle position and the actual vehicle position are different from each other. In this case, the parking assist control is continued as long as the system error is not detected and thus the vehicle may be guided to an in appropriate position different from the target parking position.

Thus, a need exists for a parking assist apparatus that can detect a system error thereof and improve reliability.

SUMMARY OF THE INVENTION

According to an aspect of the present invention, a method for performing a parking assist control for automatically guiding a vehicle to a target parking position includes the steps of calculating a change of a vehicle direction based on a traveling distance of the vehicle and a steering angle obtained by a steering angle sensor, calculating the change of the vehicle direction based on a yaw rate obtained by a yaw rate sensor, and determining whether or not the parking assist control is required to be stopped based on a result of a comparison between the calculated changes of the vehicle direction.

According to another aspect of the present invention, a parking assist apparatus for performing a parking assist control for automatically guiding a vehicle to a target parking position includes a traveling distance calculating means for calculating a traveling distance of a vehicle during an implementation of the parking assist control, a first calculating means for calculating a change of a vehicle direction occurring within the traveling distance based on the traveling distance and a steering angle obtained by a steering angle sensor, and a second calculating means for calculating the change of the vehicle direction occurring within the traveling distance based on a yaw rate obtained by a raw rate sensor. The parking assist apparatus further includes a determining means for comparing calculated results obtained by the first calculating means and the second calculated means, and determining whether or not the parking assist control is required to be stopped based on a result of a comparison between the calculated results.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

An embodiment of the present invention is explained referring to attached drawings.

Figure 1:
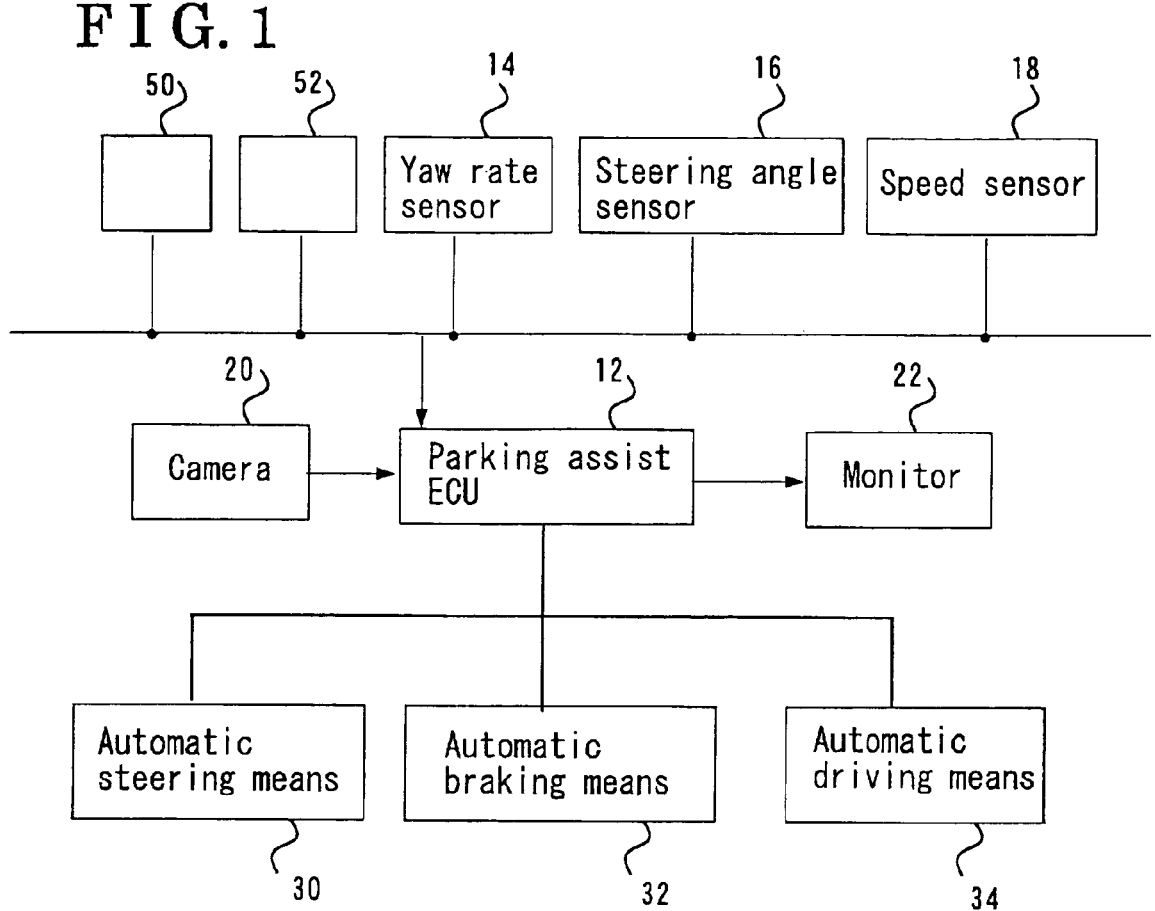
FIG. 1 is a block diagram showing a structure of a parking assist system as an example of a parking assist apparatus according to an embodiment of the present invention.

FIG. 1 is a block diagram showing a structure of a parking assist system as an example of a parking assist apparatus according to the present embodiment. As shown in FIG. 1, the parking assist system mainly includes an electronic control unit 12. The electronic control unit 12 (hereinafter called parking assist ECU 12) comprises a microcomputer including a CPU, ROM, RAM and the like connected to each other via a bus (not shown). The ROM stores a program to be implemented by the CPU, and a predetermined value of the vehicle such as a wheel base length L and an overall wheel gear ratio $\eta$.

As shown in FIG. 1, a yaw rate sensor 14 for detecting an angular velocity in a yaw direction of the vehicle (yaw rate Yr), a steering angle sensor (i.e. ground wheel angle sensor) 16 for detecting a steering angle Ha of a steering wheel (not shown), and a speed sensor 18 for detecting a vehicle speed V are connected to the parking assist ECU 12 via an appropriate bus such as a high-speed communication bus. The speed sensor 18 is provided at each wheel of the vehicle and may output a pulse signal in a cycle in accordance with the wheel speed. Each output signal of the yaw rate sensor 14, the steering angle sensor 16 and the speed sensor 18 is supplied to the parking assist ECU 12.

A reverse switch 50 and a parking switch 52 are also connected to the parking assist ECU 12. The reverse switch 50 is normally maintained in an OFF status excluding a case in which a transmission shift lever is turned in a reverse position. In such a case, the reverse switch 50 outputs an ON signal. The parking switch 52 is disposed in a vehicle interior and can be operated by a user. The parking switch 52 is normally maintained in an OFF status and turned in an ON status by the operation of the user. The parking assist ECU 12 determines whether or not the vehicle is in a process of reversing based on the output signal from the reverse switch 50 as well as determines whether or not the user requires the parking assist based on the output signal from the parking switch 52.

Figure 2:
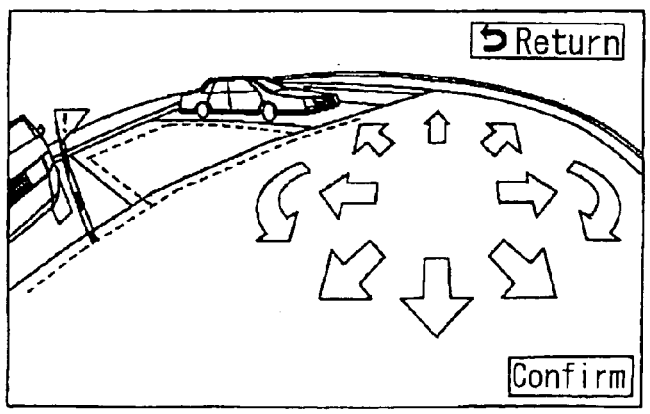
FIG. 2 is a view showing a touch panel for setting a target parking position on a monitor.

Further, a camera 20 attached to a center portion of a bumper disposed at a rear portion of the vehicle and a monitor 22 disposed in the vehicle interior are connected to the parking assist ECU 12. The camera 20 is a CCD camera for taking an image rearward of the vehicle within a predetermined angle range. A signal of the image taken by the camera 20 is sent to the parking assist ECU 12. The parking assist ECU 12 displays the image taken by the camera 20 on the monitor 22 when the reverse switch 50 and the parking switch 52 are both in ON status. In this case, as shown in FIG. 2, a touch panel for setting the target parking position is displayed on the monitor 22 together with the image. The user brings a target parking frame on the image (indicated by a dashed line) to overlap with an actual parking frame (indicated by a solid line) on the monitor 22 by using the touch panel for setting the target parking position. When the position of the target parking frame is fixed on the image, the parking assist ECU 12 calculates a target locus (see FIG. 3) for guiding the vehicle into the target parking frame on the image from the present position while avoiding an obstacle. At the same time, the parking assist ECU 12 calculates a target steering angle of the wheels required at each position on the target locus.

Furthermore, an automatic steering means 30, an automatic braking means 32, and an automatic driving means 34 are connected to the parking assist ECU 12 via an appropriate bus. The parking assist ECU 12 controls these means 30, 32 and 34 so that the vehicle is guided into the target parking frame along the target locus. That is, the parking assist ECU 12 brings the vehicle to automatically reverse at a predetermined speed through the automatic driving means 34 and the automatic braking means 32 and at the same time to automatically change the wheel steering angle by the target angle through the automatic steering means 30 at each vehicle position. Then, when the vehicle reaches an inside of the target parking frame, the vehicle is stopped by the automatic braking means 32. According to the parking assist system of the present embodiment, the vehicle is automatically guided to the target parking position by the user setting the target parking position on the monitor 22. However, this invention is not limited to the parking assist control by the aforementioned manner and may be accomplished by a manner in which the vehicle is moved by a creep force while the automatic steering is conducted by the automatic steering means 30 and stopped by the automatic braking means 32 if necessary.

Figure 3:
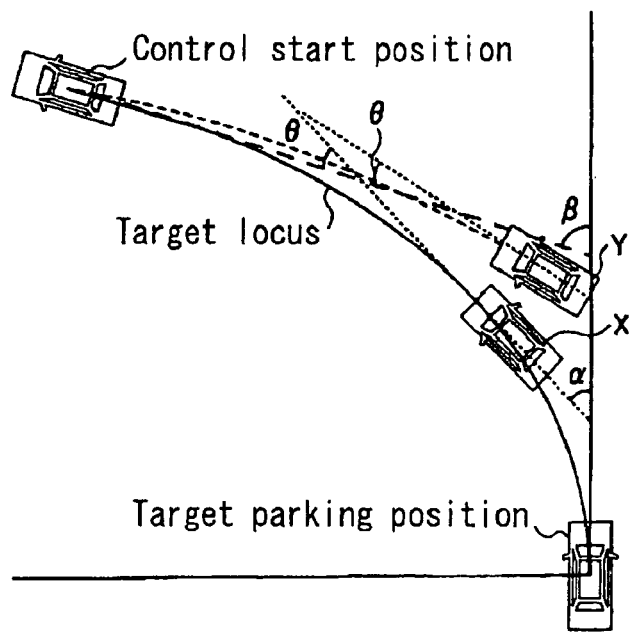
FIG. 3 is a view for explaining a state in which a difference exists between an estimated vehicle position X and an actual vehicle position Y.
Figure 4:
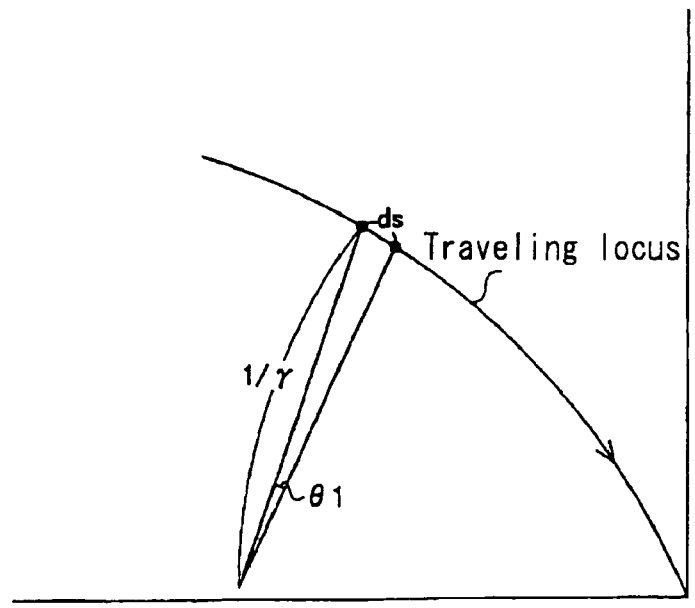
FIG. 4 is a view for explaining an estimating method of a present vehicle position.

The parking assist ECU 12 of the present embodiment calculates a traveling distance and a deflection angle of the vehicle based on the output signal from the speed sensor 18 and the steering angle sensor 16 during the implementation of the parking assist control. The traveling distance of the vehicle is specified from the start of the parking assist control to the present point and calculated by performing time integration on the output signal of the speed sensor 18. The deflection angle of the vehicle is calculated by an equation 1 where an angle defined between the vehicle direction (axle direction) at the parking assist start and the present vehicle direction is $\theta$ (hereinafter called deflection angle $\theta$) as shown in FIG. 3. The vehicle deflection angle $\theta$ calculated by the parking assist ECU 12 based on the output signal from the seed sensor 18 and the steering angle sensor 16 is defined as a deflection angle $\theta$ h while the vehicle deflection angle $\theta$ calculated based on a yaw rate Yr of the yaw rate sensor 14 is defined as a deflection angle $\theta$ y. $\theta$ h is calculated by an equation 1.

$$\theta h = \int \gamma ds \qquad \text{(Equation 1)}$$

where $\gamma$ indicates a road curvature determined based on the steering angle Ha obtained by the steering angle sensor 16, i.e. calculated by an equation $\gamma = Ha/L \cdot \eta$, for example. L indicates a wheel base length and $\eta$ indicates an overall gear ratio (ratio of the steering angle Ha relative to the wheel steering angle). ds indicates a subtle traveling distance (delta displacement), i.e. a traveling distance per delta time equivalent to a sampling period of the steering angle sensor 16, for example. The delta displacement ds is calculated by integrating the output signal of the speed sensor 18 (i.e. wheel speed pulse) by the delta time. In addition, the overall integration interval of the equation 1 is equal to the traveling distance of the vehicle from the parking assist start to the present point. That is, the deflection angle $\theta$ calculated in the equation 1 corresponds to a sum of each deflection angle $\theta$ 1 calculated at each delta displacement from the parking assist control start to the present point. The relation between the road curvature $\gamma$ and the steering angle Ha may be stored in the ROM of the electronic control unit 12 as a map based on the correlation data obtained per each vehicle beforehand.

The deflection angle $\theta$ 1 obtained at each delta displacement is equivalent to a center angle $\theta$ 1 of a circle with a radius of $1/\gamma$ and a circumference of a traveling locus obtained by the vehicle traveling by the delta displacement. The present vehicle position relative to the vehicle position at the parking assist control start can be then estimated based on each record of the delta displacement ds and the deflection angle $\theta$ 1. Therefore, according to the parking assist ECU 12 of the present embodiment, first, the present vehicle position can be estimated based on each record of the delta displacement ds and the deflection angle $\theta$ 1. Then the wheel steering angle is automatically changed by a target wheel angle in accordance with the estimated vehicle position, thereby guiding the vehicle into the target parking frame along the target locus.

According to the parking assist system of the present embodiment as mentioned above, the target wheel angle by which the vehicle can be guided into the target parking frame along the target locus is predetermined at each vehicle position on the target locus. Therefore, the vehicle can be accurately guided into the target parking frame along the target locus as long as the vehicle position is accurately estimated during the implementation of the parking assist control. However, as mentioned above, information obtained from the speed sensor 18 and the steering angle sensor 16 is used for estimating the vehicle position. Thus, if an estimated vehicle position X and an actual vehicle position Y are different from each other due to a system error such as a malfunction (sensor fault) of the sensor itself or an environmental disturbance, the vehicle is possibly guided to an appropriate position different from the target parking position as schematically shown in FIG. 3.

Especially the steering angle Ha obtained by the steering angle sensor 16 does not directly indicate the actual vehicle direction and thus cannot detect the change of the vehicle direction due to the road disturbance. In addition, the steering angle Ha is a relative value to a value obtained when the vehicle is straightly running, which is defined as zero point steering angle value. If an error exists in the zero point steering angle value, the steering angle Ha of the steering angle sensor 16 does not correspond to the actual vehicle direction. Accordingly, even if no malfunction occurs in the function itself of the steering angle sensor 16, the difference may appear between the estimated vehicle position and the actual vehicle position. If the occurrence of the difference cannot be detected, the same problem as that caused when the estimated vehicle position X and the actual vehicle position Y are different from each other as mentioned above may occur.

Whereas, according to the present embodiment, the deflection angle θ y based on the yaw rate Yr detected by the yaw rate sensor 14 is calculated as well as the deflection angle θ h based on the steering angle Ha detected by the steering angle sensor 16. Then, both deflection angles θ y and θ h are compared with each other to thereby enable to detect the occurrence of difference between the estimated vehicle position and the actual vehicle position.

Precisely, the parking assist ECU 12 calculates the deflection angle θ h based on the output signal of the speed sensor 18 and the steering angle sensor 16 during the implementation of the parking assist control and at the same time calculates the deflection angle θ y based on the output signal of the yaw rate sensor 14. The deflection angle θ y is calculated by performing integration time on the yaw rate Yr (Yr=$d\theta_{yaw}$/dt, θyaw:yaw angle) by the yaw rate sensor 14 as shown in an equation 2.

$$\theta y = \int Y_r dt \qquad \text{(Equation 2)}$$

In this case, the integration interval of the equation 2 corresponds to that of the equation 1, i.e. from the parking assist control start to the present point. In addition, the calculation cycle of the deflection angle θ y corresponds to that of the deflection angle θ h and may be every 5 m of the traveling distance of the vehicle, for example.

The parking assist ECU 12 of the present embodiment compares the two deflection angles θ h and θ y simultaneously calculated (at the same vehicle position) per calculating cycle. If the difference between these two deflection angles θ h and θ y is greater than a predetermined threshold value, it is determined that the error such as the malfunction occurs in the yaw rate sensor 14 or the steering angle sensor 16, or difference exists between the estimated vehicle position and the actual vehicle position. Then, the parking assist control is halted (or the target locus is reset). Meanwhile, if the difference between the two deflection angles θ h and θ y is not greater than the predetermined threshold value, the parking assist control is continued. The calculation and comparison of the deflection angles θ h and θ y are performed until the vehicle reaches the target parking position from the start of the parking assist control.

The yaw rate Yr detected by the yaw rate sensor 14 directly indicates the actual vehicle direction, which is different from the steering angle Ha detected by the steering angle sensor 16. Thus, the yaw rate Yr can detect the change of the vehicle direction due to the road disturbance. The yaw rate Yr can detect the road disturbance, which cannot be detected by monitoring the record (changing) of the deflection angle θ h, only by monitoring the record of the deflection angle θ y without comparing the two deflection angles θ h and θ y. However, the error cannot be detected by only monitoring the record of the deflection angle θ y if the error such as the malfunction exists in the yaw rate sensor 14. Therefore, the road disturbance cannot be detected because of the malfunction of the yaw rate sensor 14 or the road disturbance may be wrongly detected. The vehicle may be guided to an inappropriate position, not the target parking position, or the parking assist control may be unnecessarily halted.

If the yaw rate sensor 14 or the steering angle sensor 16 malfunctions, the difference between the deflection angles θ h and θ y becomes large. In addition, since the yaw rate Yr detected by the yaw rate sensor 14 directly indicates the actual vehicle direction as mentioned above, the difference between the deflection angles θ h and θ y becomes large in case that the actual vehicle direction is changed due to the road disturbance.

According to the present embodiment, the occurrence of the malfunction of the yaw rate sensor 14 or the steering angle sensor 16 can be detected by evaluating the difference between the deflection angles θ h and θ y. At the same time, the occurrence of the difference between the estimated vehicle position and the present vehicle position due to the road disturbance and the like can be detected. Therefore, the malfunction of the yaw rate sensor 14 or the steering angle sensor 16 can be surely detected as well as the vehicle is surely prevented from being guided to the inappropriate position, not to the target parking position. The reliability of the parking assist system may be greatly improved according to the present embodiment.

Next, another embodiment is explained in the following. In the another embodiment, a deflection angle θ1' obtained by integrating the yaw rate Yr of the yaw rate sensor 14 by the delta time is ued for estimating the vehicle position during the implementation of the parking assist control, instead of the aforementioned deflection angle θ1 obtained per delta displacement. In this case as well, the present vehicle position relative to the vehicle position at the parking assist control start can be estimated based on each record of the delta displacement ds and the deflection angle θ1' per delta time corresponding to the delta displacement.

As mentioned above, the yaw rate Yr of the yaw rate sensor 14 directly indicates the actual vehicle direction and thus can detect the change of the vehicle direction due to the road disturbance. However, in the another embodiment as well, the error cannot be detected if the yaw rate sensor 14 malfunctions. Thus, the vehicle may be guided to the inappropriate position, not to the target parking position, due to the malfunction of the yaw rate sensor 14.

Therefore, according to the another embodiment, the deflection angle θ h is calculated based on the output signal from the speed sensor 18 and the steering angle sensor 16 while the vehicle deflection angle θ y is calculated based on the output signal from the yaw rate sensor 14 during the implementation of the parking assist control, which is the same condition as the aforementioned embodiment. In addition, the deflection angles θ h and θ y simultaneously calculated (at the same vehicle position) are compared with each other per calculating cycle. If the difference between the two deflection angles θ h and θ y is greater than a predetermined threshold value, it is determined that the yaw rate sensor 14 or the steering angles sensor 16 malfunctions, thereby halting the parking assist control.

According to the another embodiment, the occurrence of the malfunction of the yaw rate sensor 14 or the steering angle sensor 16 can be detected by evaluating the difference between the deflection angles θ h and θ y, thereby preventing the vehicle from being wrongly guided to the inappropriate position different from the target parking position.

In the another embodiment, the vehicle position may be estimated based on the yaw rate sensor 14 and at the same time further estimated based on the output signal from the speed sensor 18 and the steering angle sensor 16 during the implementation of the parking assist control. In this case also, the occurrence of the malfunction of the yaw rate sensor 14 or the steering angle sensor 16 can be detected by evaluating the difference between the estimated vehicle position estimated by the yaw rate sensor 14 or the speed sensor 18 and the estimated vehicle position estimated by the steering angle sensor 16.

The present invention is not limited to the aforementioned embodiments and can be changed within the scope of the present invention.

According to the above-mentioned embodiments, the integration interval for calculating each deflection angle θ h or θ y is defined from the start of the parking assist control to the present point. However, the integration interval after a point at which 5 m of the traveling distance is exceeded may be defined from a point 5 m before the present point to the present point as long as the integration intervals for the deflection angles θ h and θ y correspond to each other. In this case as well, the occurrence of the malfunction of the yaw rate sensor 14 or the steering angle sensor 16 can be detected by comparing the deflection angles θ h and θ y per calculating cycle.

According to the above-mentioned embodiments, the angle defined between the vehicle direction at the start of the parking assist control and the present vehicle position is used for comparison as the deflection angle θ. However, parameters individually corresponding to the deflection angle θ may be compared with each other. For example, an angle α (see FIG. 3) defined between the direction of the vehicle positioned within the target parking frame and the present vehicle direction may be compared. In this case, the angle α is obtained by β−θ, where β is a known angle defined between the vehicle direction at the start of the parking assist control and the direction of the vehicle positioned within the target parking frame.

According to the above-mentioned embodiments, the system error can be detected and thus the reliability of the parking assist control may be improved.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A method for performing a parking assist control for automatically guiding a vehicle to a target parking position, comprising:
    calculating a first change of a vehicle direction based on output of a speed sensor and a steering angle obtained by a steering angle sensor;
    calculating a second change of the vehicle direction based on a yaw rate obtained by a yaw rate sensor;
    comparing the first change of the vehicle direction and the second change of the vehicle direction; and
    determining whether or not the parking assist control is required to be stopped based on a result of a comparison between the first and second calculated changes of the vehicle direction.

2. A method for performing a parking assist control according to claim 1, wherein the calculation of the first change of the vehicle direction and the calculation of the second change of the vehicle direction are performed at the same time.

3. A parking assist apparatus for performing a parking assist control for automatically guiding a vehicle to a target parking position, comprising:
    a traveling distance calculating means for calculating a traveling distance of a vehicle during an implementation of the parking assist control;
    a first calculating means for calculating a first change of a vehicle direction occurring within the traveling distance based on output of a speed sensor and output of a steering angle sensor;
    a second calculating means for calculating a second change of the vehicle direction occurring within the traveling distance based on a yaw rate obtained by a raw rate sensor; and
    a determining means for comparing calculated results obtained by the first calculating means and the second calculated means and determining that the parking assist control is to be stopped when a difference between the first change of the vehicle direction and the second chance of the vehicle direction is greater than a predetermined value.

4. A vehicle assist apparatus according to claim 3, wherein the determining means compares the calculated results of the first calculating means and the second calculated means which are calculated at the same time.

5. A parking assist apparatus according to claim 3, wherein the second calculating means calculates a deflection angle θ y based on the yaw rate sensor.

6. A parking assist apparatus according to claim 3, wherein
    the first calculating means calculates a deflection angle θ h based on the speed sensor and the steering angle sensor.

7. A parking assist apparatus according to claim 3, wherein
    the second calculating means calculates a deflection angle θ y based on the yaw rate sensor.

8. A parking assist apparatus according to claim 3, wherein
    the determining means determines that one of the yaw rate sensor and the steering angle sensor is fault when a difference between the deflection angles θ h and θ y is greater than the predetermined value.

9. A parking assist apparatus for performing a parking assist control for guiding a vehicle to a target parking position, comprising:
    a first calculating means for calculating a first change of a vehicle direction based on output of a speed sensor and output of a steering angle sensor;
    a second calculating means for calculating a second change of the vehicle direction based on output obtained by a raw rate sensor; and
    a determining means for comparing calculated results obtained by the first calculating means and the second calculated means and determining that the parking assist control is to be stopped based on a result of a comparison between the calculated results when a difference between the first change of the vehicle direction and the second chanae of the vehicle direction is greater than a predetermined value.

10. A parking assist apparatus according to claim 9, wherein the first calculating means calculates a deflection angle θ h based on the output of the speed sensor and the steering angle sensor.

11. A parking assist apparatus according to claim 10, wherein the second calculating means calculates a deflection angle θ y based on the output of the yaw rate sensor.

12. A parking assist apparatus according to claim 11, wherein the determining means determines that one of the yaw rate sensor and the steering angle sensor is fault when a difference between the deflection angles θ h and θ y is greater than the predetermined value.

13. A method for performing a parking assist control according to claim 1, further comprising determining that the parking assist control is required to be stopped when a difference between the first change of the vehicle direction and the second change of the vehicle direction is greater than a predetermined value.

\* \* \* \* \*